(12) United States Patent
Liu

(10) Patent No.: US 8,373,670 B2
(45) Date of Patent: Feb. 12, 2013

(54) ELECTRONIC DEVICE WITH DYNAMICALLY ADJUSTED TOUCH AREA

(75) Inventor: Tang-Hui Liu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 552 days.

(21) Appl. No.: 12/616,148

(22) Filed: Nov. 11, 2009

(65) Prior Publication Data

US 2011/0109563 A1 May 12, 2011

(51) Int. Cl.
*G06F 3/041* (2006.01)
(52) U.S. Cl. ........................................... 345/173
(58) Field of Classification Search ........... 345/173–176
See application file for complete search history.

(56) References Cited

U.S. PATENT DOCUMENTS

2006/0197753 A1* 9/2006 Hotelling ................ 345/173
2006/0290679 A1* 12/2006 Lii ........................... 345/173

FOREIGN PATENT DOCUMENTS

TW I296388 5/2008
TW 200917102 4/2009

* cited by examiner

*Primary Examiner* — Alexander Eisen
*Assistant Examiner* — Amit Chatly
(74) *Attorney, Agent, or Firm* — Winston Hsu; Scott Margo

(57) ABSTRACT

A method for adjusting at least a area of a touch screen is provided. The touch panel includes a first touch area and a second touch area, the first touch area is responsive to a stationary touch and corresponds to a first function, and the second touch area is responsive to a sliding touch and corresponds to a second function. The method includes: defining an overlapped touch area including at least part of the first touch area and at least part of the second touch area; receiving a touch input on the touch panel; when the touch input is started from the overlapped touch area, calculating a moving distance of the touch input and a touch time of the touch input; and when the touch time is within a threshold time, and the moving distance exceeds a threshold distance, setting the overlapped touch area to correspond to the second function.

15 Claims, 5 Drawing Sheets

ELECTRONIC DEVICE WITH DYNAMICALLY ADJUSTED TOUCH AREA

BACKGROUND OF THE INVENTION

1. Field of the Invention

This invention relates to electronic devices with touch panels, and more particularly, to a method of adjusting the size of a touch area of a touch panel corresponding to a function of an electronic device.

2. Description of the Prior Art

Many newly developed electronic devices, such as mobile phones, incorporate touch screen technology in their displays. This allows greater flexibility, as a user merely needs to touch an icon corresponding to a particular function for selecting that function, rather than using a traditional keyboard display to scroll between many functions. Unfortunately, there will always be a trade-off between a number of functions that can be displayed at a given time and a size and weight of the mobile phone. At a certain point, the portability of the mobile phone will be affected by a large number of functions requiring an increased display screen size. Manufacturers must therefore come up with innovative ways of allowing increased functions while maintaining the lightweight and portable advantages of the mobile phone (or any electronic portable device).

Some devices utilize displays wherein icons that are close together respond to different movements: for example, selecting a function corresponding to an icon when the touch screen is tapped with a single finger; when two fingers are moved on the touch screen in a scrolling fashion, scrolling through the display on the display screen. A problem still arises, however, when the icons are too numerous to allow easy selection. Please refer to FIG. 1, which is a diagram of a traditional touch panel 100. As can be seen at the bottom of the display, a 'zoom' bar 104 is displayed directly below a bar 102 containing various icons corresponding to a menu of the touch screen 100. The zoom bar 104 is designed to be operated by fingers moving in a scrolling fashion (sliding motion) whereas the menu bar 102 icons respond to a stationary touch. If, however, a user accidentally uses the scrolling motion in an area that does not correspond to the zoom bar 104 because the zoom bar 104 is too small, the zoom bar function will fail to respond. In a system that does not take advantage of the different movements used for selecting different functions, the user will erroneously select the menu bar 102.

SUMMARY OF THE INVENTION

It is therefore an objective of the present disclosure to provide a method for extending the touch area of functions on a touch panel of an electronic device, while ensuring that undesired functions are not erroneously performed. An exemplary electronic device having a display screen wherein touch areas corresponding to specific functions can be extended is also provided.

An electronic device has a touch panel, wherein the touch panel comprises: a first touch area that is responsive to a stationary touch and corresponds to a first function; a second touch area that is responsive to a sliding touch and corresponds to a second function; and an overlapped touch area, comprising at least part of the first touch area and at least part of the second touch area, wherein when a touch input on the touch panel is started from the overlapped touch area, a touch time of the touch input is within a threshold time, and a moving distance of the touch input exceeds a threshold distance, the overlapped touch area is set to correspond to the second function.

A method for adjusting at least an area of a touch panel, wherein the touch panel comprises a first touch area and a second touch area, the first touch area is responsive to a stationary touch and corresponds to a first function, and the second touch area is responsive to a sliding touch and corresponds to a second function, comprises: defining an overlapped touch area comprising at least part of the first touch area and at least part of the second touch area; receiving a touch input on the touch panel; when the touch input is started from the overlapped touch area, calculating a moving distance of the touch input and a touch time of the touch input; and when the touch time is within a threshold time, and the moving distance exceeds a threshold distance, setting the overlapped touch area to correspond to the second function.

A computer programmable media for adjusting at least an area of a touch panel is also provided, wherein the touch panel comprises a first touch area and a second touch area, the first touch area is responsive to a stationary touch and corresponds to a first function, and the second touch area is responsive to a sliding touch and corresponds to a second function. The computer programmable media is capable of performing the following functions: defining an overlapped touch area comprising at least part of the first touch area and at least part of the second touch area; receiving a touch input on the touch panel; when the touch input is started from the overlapped touch area, calculating a moving distance of the touch input and a touch time of the touch input; and when the touch time is within a threshold time, and the moving distance exceeds a threshold distance, setting the overlapped touch area to correspond to the second function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
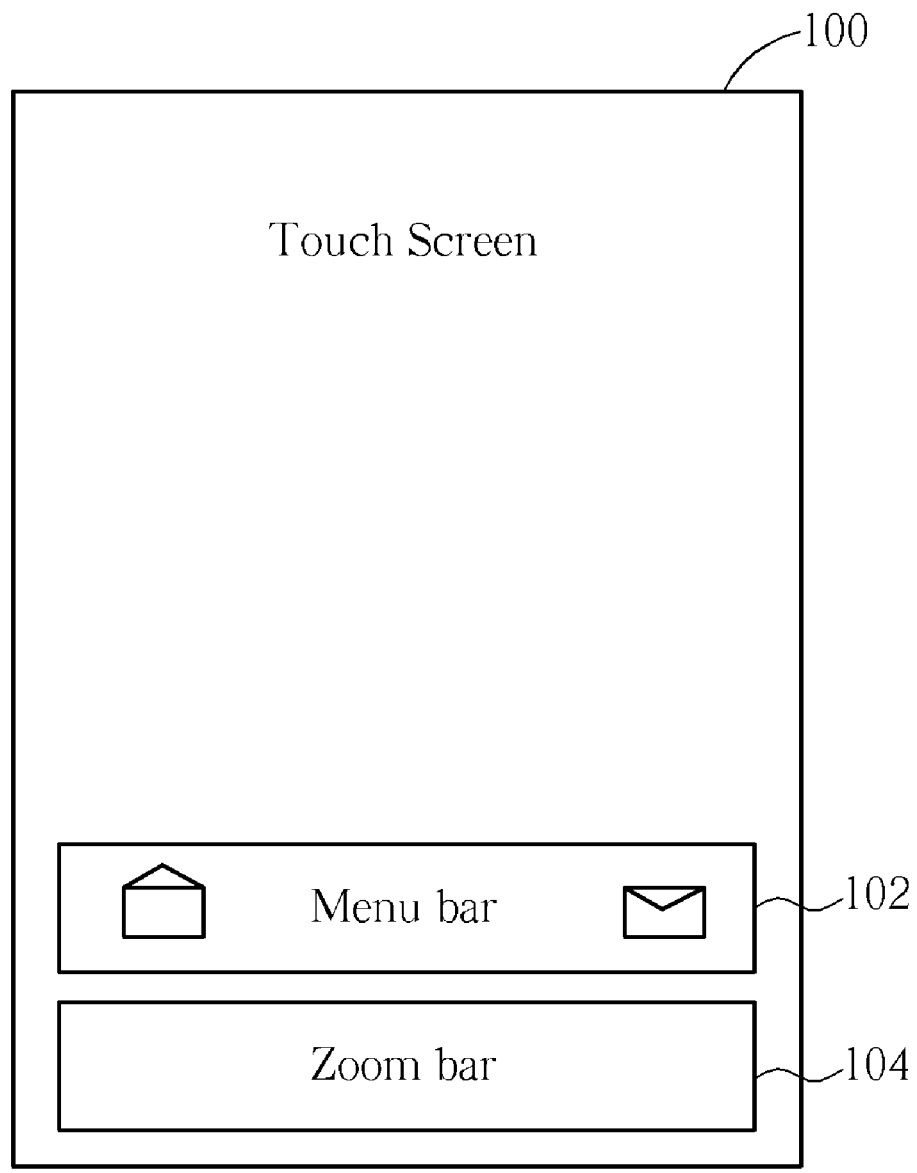
FIG. 1 is a diagram of an electronic device having a touch panel.

The method detailed below may be applied to the electronic device shown in FIG. 1, and can also be applied to any electronic device with a touch pad, for example, a mobile phone, a personal digital assistant (PDA), a PDA mobile phone, a lap top computer, a car computer, a digital camera, a music player, a game device. The electronic device may utilize a computer programmable media, wherein the computer programmable media may be capable of performing the operations detailed below. The touch panel can comprise, but is not limited to, a first functional area and a second functional area. The following example utilizes a menu bar functional area as the first functional area and a zoom bar functional area as the second functional area, but these specific functions could be replaced by any other functions possible on an electronic device, where a first functional area and a second functional area are activated by different touch inputs.

Figure 3:
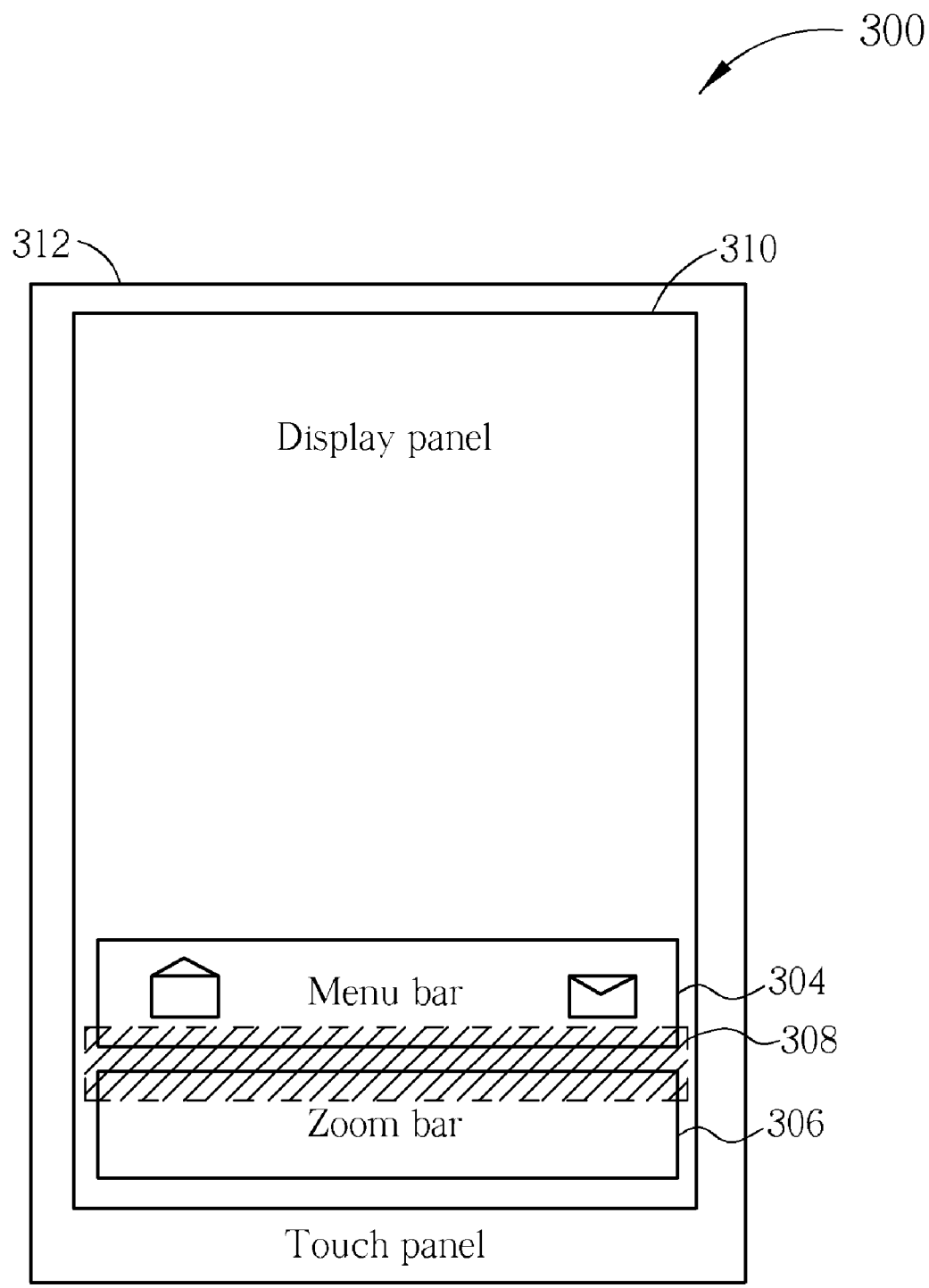
FIG. 3 is an exemplary diagram of an overlapped area of a touch panel of an electronic device according to a first example of the present invention.
Figure 4:
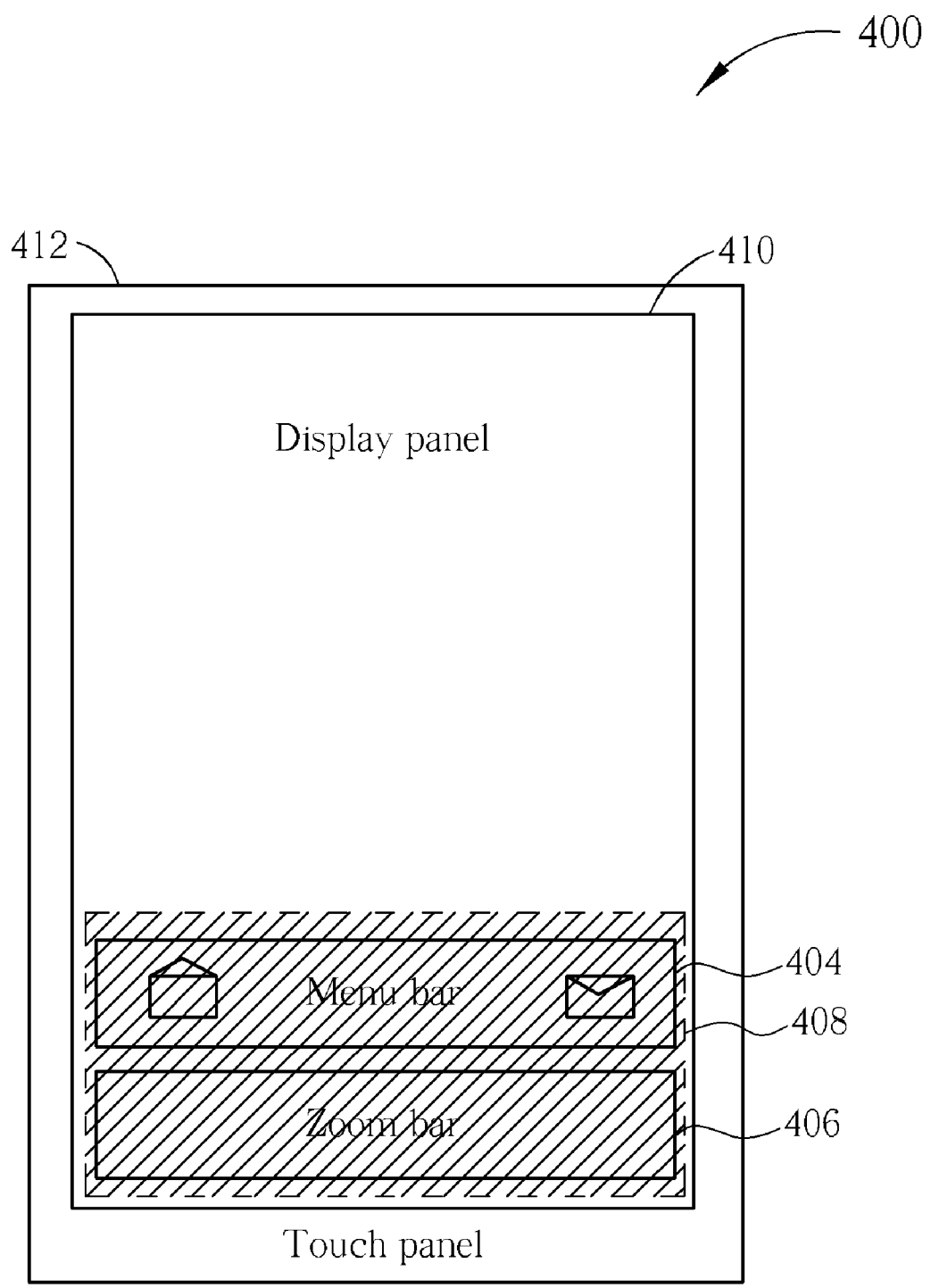
FIG. 4 is an exemplary diagram of an overlapped area of a touch panel of an electronic device according to a second example of the present invention.
Figure 5:
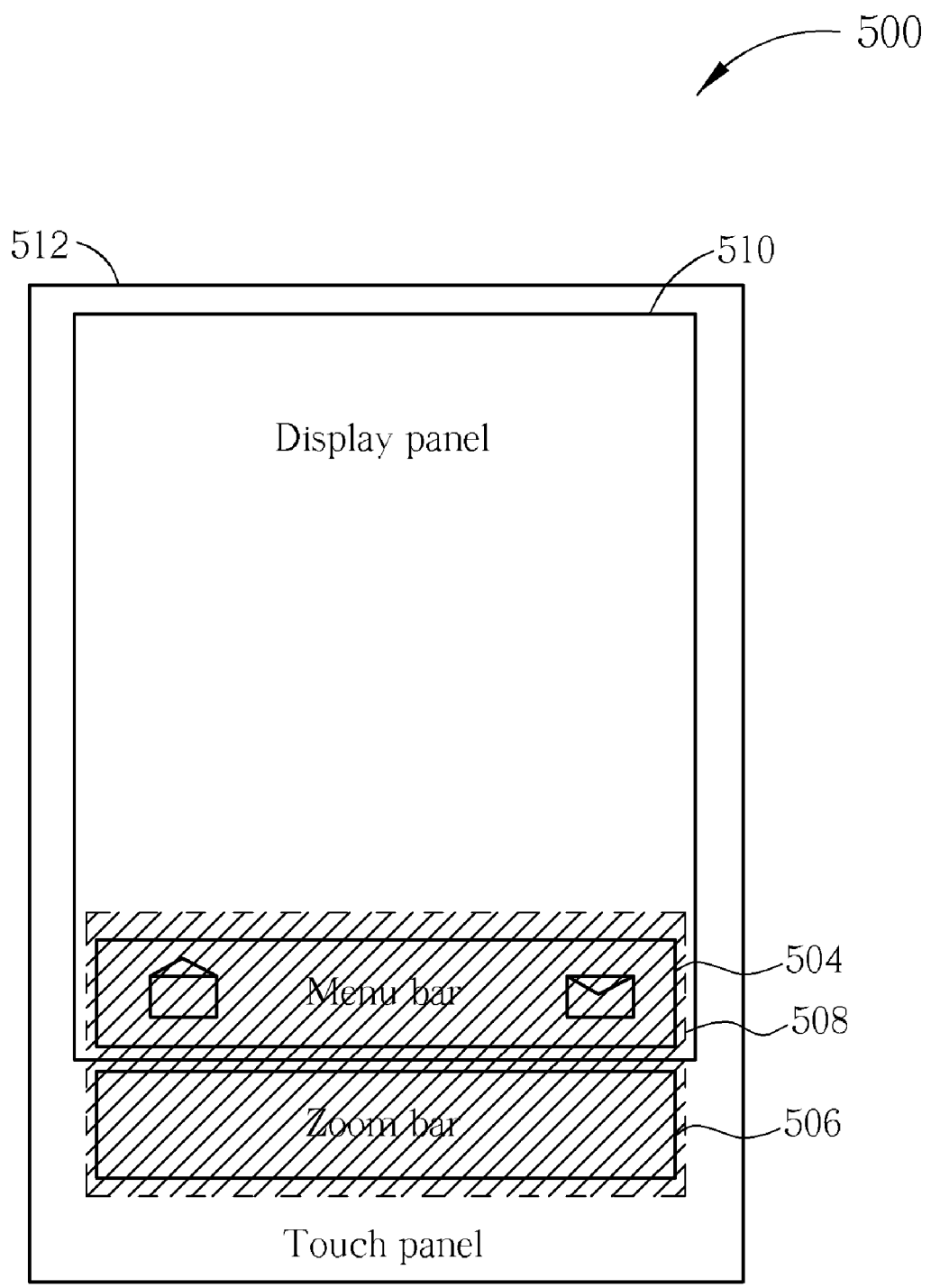
FIG. 5 is an exemplary diagram of an overlapped area of a touch panel of an electronic device according to a third example of the present invention.

The first stage is to adjust at least one of the zoom bar functional area and menu bar functional area beyond that shown on the touch panel. This allows a user to still be able to select the zoom function or menu function according to the proper motion even if the user's fingers extend beyond the area of the zoom/menu bar that is shown on the touch panel. This is achieved by defining an overlapped area that corresponds to both the menu bar and the zoom bar. This overlapped area may comprise at least part of the menu bar and at least part of the zoom bar but may also correspond to the whole of the menu bar and zoom bar area. It should also be noted that it is possible that a touch panel area is greater than an area of the display panel. For example, the menu bar functional area may be displayed on the display panel while the zoom bar functional area may be represented by a hardware bar that is out of the display panel area but is still activated by a touch input. Various modifications of the size of the touch panel all fall within the scope of the disclosure, and are represented by FIGS. 3, 4 and 5 (detailed below).

In order to ensure that a function is not erroneously selected, algorithms may be employed to distinguish between user desired operations. A plurality of thresholds may be set, wherein the thresholds determine whether the menu bar or zoom bar function is selected. The overlapped area can be defined according to a programmer's requirements, but it is also possible that the size of the overlapped area can be set according to a user command—in this case, someone with poor eyesight can increase the size of the overlapped area in order to compensate for their vision.

In the example given herein the menu bar and zoom function are utilized as exemplary configurations; however, it will be appreciated by one skilled in the art that the innovative techniques can also be applied to many other examples.

As detailed above, the menu bar responds to a touch motion, whereas the zoom bar responds to a sliding motion. The overlapped area can be set to respond to both motions. Upon receipt of a touch input in the overlapped area, the type of touch input received is determined, and that determination may be used to set the overlapped area to either the first function or the second function. Two parameters may be used to ascertain which function a user wishes to select. The above example can therefore set two thresholds—one corresponding to time and one corresponding to distance—and may use these thresholds in combination to determine whether to set the overlapped area to the first function or to the second function. At the time of a touch input, both parameters begin to be calculated and compared to their respective thresholds. This is because it is unlikely that a touch input to the touch panel will be wholly stationary as hands have some inherent movement, and this touch input could be erroneously assumed to be a sliding touch. Use of both the parameters in combination allows a type of touch input can be accurately determined.

Upon contact (touch input) with the overlapped area of the touch panel, a touch time and a moving distance of the fingers is calculated. While the touch time remains within the threshold time, the moving distance becomes the crucial threshold. When the moving distance exceeds the threshold distance while the touch time is still within the threshold, it can be assumed that the user wishes to perform the zoom function and hence the overlapped area may be set to correspond to the zoom function. If the fingers are lifted off before the moving distance is exceeded (i.e. the touch input is ended, so both the touch time and moving distance are within their respective thresholds), it can be assumed that the user wishes to select the menu bar and hence the overlapped area may be set to correspond to the menu bar. If the touch time exceeds the threshold while the moving distance is still within the threshold, the overlapped area may be set to correspond to the menu bar.

Figure 2:
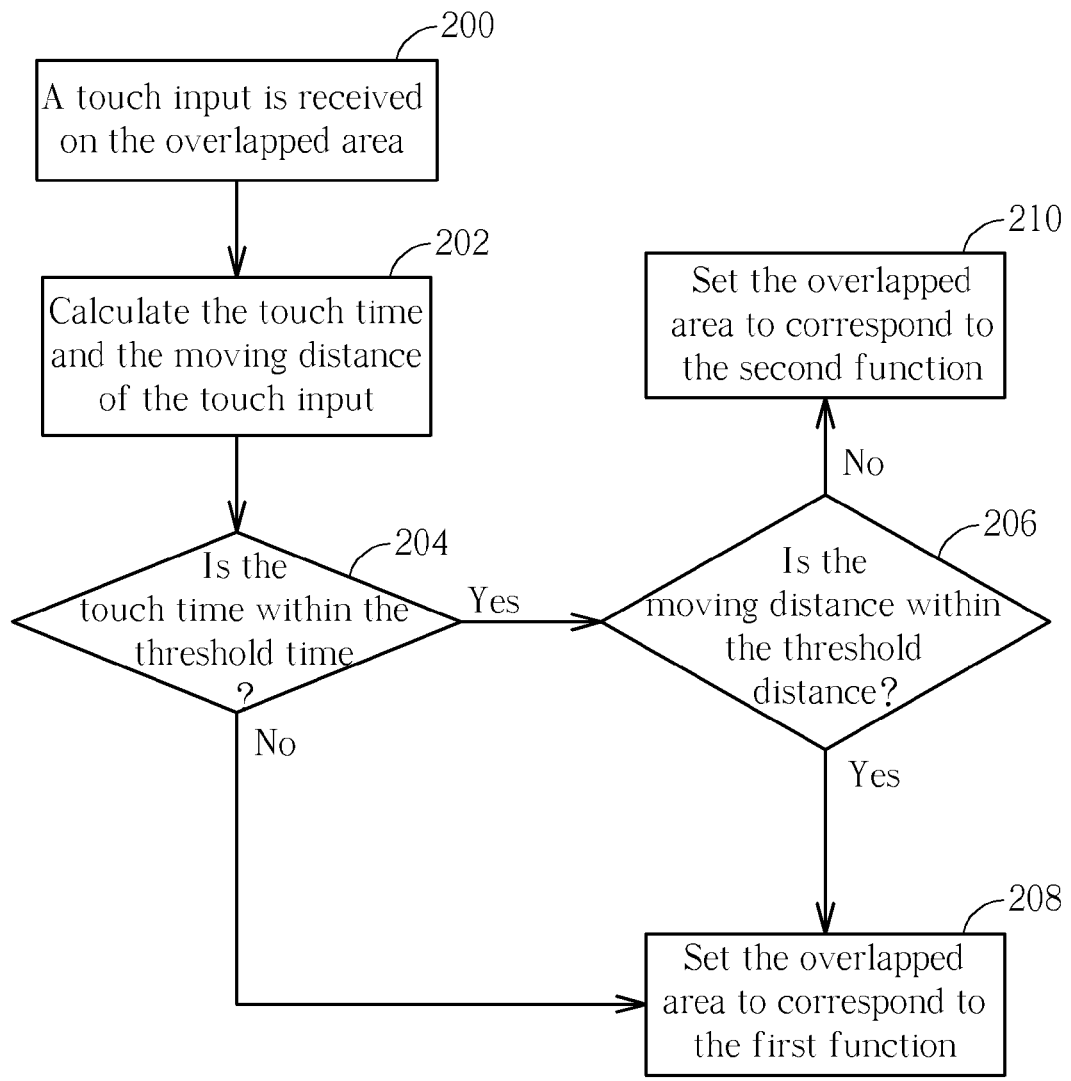
FIG. 2 is a flowchart of a method of extending an area of a touch panel according to a configuration of the present invention.

Please refer to FIG. 2, which is a flowchart detailing the steps of the above method. The steps are as follows:

Step 200: A touch input is received on the overlapped area;

Step 202: Calculate the touch time and the moving distance of the touch input;

Step 204: Is the touch time within the threshold time? If yes, go to Step 206; if no, go to Step 208;

Step 206: Is the moving distance within the threshold distance? If yes, go to Step 208; if no, go to Step 210;

Step 208: Set the overlapped area to correspond to the first function;

Step 210: Set the overlapped area to correspond to the second function.

As noted above, the overlapped area may cover an area comprising part of the menu bar and part of the zoom bar, or may correspond to an area comprising all of the menu bar and the zoom bar. The size and exact boundaries of the extended area are not limited to the above examples; whichever boundaries the extended area is determined to have, the method of determining which function is selected can still be the same. Please refer to FIGS. 3, 4 and 5. FIG. 3 shows an example of an electronic device 300 having a touch panel 312, where the overlapped area 308 (the shaded part) corresponds to part of the menu bar 304 and part of the zoom bar 306. In this example, both the menu bar 304 and the zoom bar 306 are displayed on the display panel 310. FIG. 4 shows an example of an electronic device 400 having a touch panel 412, where the overlapped area 408 (the shaded part) corresponds to the whole menu bar 404 and the whole zoom bar 406. In this example, both the menu bar 404 and the zoom bar 406 are displayed on the display panel 410. FIG. 5 shows an example of an electronic device 500 having a touch panel 512, where the overlapped area 508 (the shaded part) corresponds to the whole menu bar 504 and the whole zoom bar 506, but only the menu bar 504 is displayed on the display panel 510. The zoom bar 506 is still within the touch panel 512, but is represented by hardware. Please note that in all these examples, the touch panel 312, 412, 512 is shown as being larger than the display panel 310, 410, 510. This is merely one representation. Various combinations and sub-combinations of the above examples are also within the scope of this disclosure.

In the case where the overlapped area does not comprise the whole of the first functional area and the second functional area (in the above example these are represented by the menu bar functional area and zoom bar functional area, respectively), and a touch input is received on a part of the menu bar functional area (for example) that is not part of the overlapped area, the overlapped area can still be utilized. In this case, the overlapped area may be set to correspond to the menu function. If a touch input is received on a part of the zoom bar functional area that is not part of the overlapped area, the overlapped area may be set to correspond to the zoom function. In the case of the zoom bar being selected, this allows for greater freedom of movement, as the zoom bar functional area responds to a sliding touch, so the whole of the zoom bar functional area and the overlapped area can be used. In the case of the menu bar being selected, this ensures that sudden movements (for example, if the electronic device is being used on a moving vehicle) will not affect the intended selection of the menu function.

Furthermore, the thresholds can be adjusted to have different sensitivities according to a user's particular requirements. This allows for greater flexibility of use.

In summary, the disclosure provides a method of adjusting a touch area's area of use, by employing various algorithms for correctly distinguishing between a user's desired operations. This allows a manufacturer to increase the number of icons and functions that can be shown on a touch panel without sacrificing ease and convenience of use, and enabling an electronic device to remain within an acceptable size and weight range.

Those skilled in the art will readily observe that numerous modifications and alterations of the device and method may be made while retaining the teachings of the invention.

What is claimed is:

1. An electronic device having a touch panel, the touch panel comprising:
    a first touch area that is responsive to a stationary touch and corresponds to a first function;
    a second touch area that is responsive to a sliding touch and corresponds to a second function; and
    an overlapped touch area, comprising at least part of the first touch area and at least part of the second touch area;
    wherein when a touch input on the touch panel is started from the overlapped touch area, a touch time of the touch input is within a threshold time, and a moving distance of the touch input is within a threshold distance, the overlapped touch area is set to correspond to the first function.

2. The electronic device of claim 1, wherein when the touch input is started from the overlapped touch area, the touch time of the touch input is within the threshold time and the moving distance of the touch input exceeds the threshold distance, the overlapped touch area is set to correspond to the second function.

3. The electronic device of claim 1, wherein when the touch input is started from the overlapped touch area, and the touch time of the touch input exceeds the threshold time, the overlapped touch area is set to correspond to the first function.

4. The electronic device of claim 1, wherein when the touch input is started from a part of the first touch area that does not correspond to the overlapped touch area, the overlapped touch area is set to correspond to the first function.

5. The electronic device of claim 1, wherein when the touch input is started from a part of the second touch area that does not correspond to the overlapped touch area, the overlapped touch area is set to correspond to the second function.

6. The electronic device of claim 1, wherein the overlapped touch area comprises all of the first touch area and all of the second touch area.

7. The electronic device of claim 1, being disposed on a portable device.

8. A method for adjusting a touch area of a touch panel, wherein the touch panel comprises a first touch area and a second touch area, the first touch area corresponds to a first function, and the second touch area corresponds to a second function, the method comprising:
    defining an overlapped touch area comprising at least part of the first touch area and at least part of the second touch area;
    receiving a touch input on the touch panel;
    when the touch input is started from the overlapped touch area, calculating a moving distance of the touch input and a touch time of the touch input;
    when the touch time is within a threshold time, and the moving distance is within a threshold distance, setting the overlapped touch area to correspond to the first function; and
    when the touch time exceeds the threshold time, setting the overlapped touch area to correspond to the first function.

9. The method of claim 8, wherein when the touch time is within the threshold time, and the moving distance exceeds the threshold distance, setting the overlapped touch area to correspond to the second function.

10. The method of claim 8, wherein the first touch area is responsive to a stationary touch and the second touch area is responsive to a sliding touch.

11. The method of claim 8, further comprising:
    when the touch input is started from a part of the first touch area that does not correspond to the overlapped touch area, setting the overlapped touch area to correspond to the first function.

12. The method of claim 8, further comprising:
    when the touch input is started from a part of the second touch area that does not correspond to the overlapped touch area, setting the overlapped touch area to correspond to the second function.

13. The method of claim 8, wherein the overlapped touch area comprises all of the first touch area and all of the second touch area.

14. The method of claim 8, wherein the touch panel is disposed on a portable device.

15. A non-transitory computer programmable media for adjusting a touch area of a touch panel, wherein the touch panel comprises a first touch area and a second touch area, the first touch area is responsive to a stationary touch and corresponds to a first function, and the second touch area is responsive to a sliding touch and corresponds to a second function, and the non-transitory computer programmable media is capable of performing the following functions:
    defining an overlapped touch area comprising at least part of the first touch area and at least part of the second touch area;
    receiving a touch input on the touch panel;
    when the touch input is started from the overlapped touch area, calculating a moving distance of the touch input and a touch time of the touch input; and
    when the touch time is within a threshold time, and the moving distance is within a threshold distance, setting the overlapped touch area to correspond to the first function.

* * * * *